United States Patent
Al-Qahtani

(10) Patent No.: US 11,331,600 B2
(45) Date of Patent: May 17, 2022

(54) MANAGING FOAM IN GAS PROCESSING SYSTEMS

(71) Applicant: Saudi Arabian Oil Company, Dhahran (SA)

(72) Inventor: Nasser A. Al-Qahtani, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 492 days.

(21) Appl. No.: 16/407,811

(22) Filed: May 9, 2019

(65) Prior Publication Data
US 2020/0353381 A1 Nov. 12, 2020

(51) Int. Cl.
*B01D 19/00* (2006.01)
*B01D 53/00* (2006.01)
(Continued)

(52) U.S. Cl.
CPC ......... *B01D 19/04* (2013.01); *B01D 19/0404* (2013.01); *B01D 53/1412* (2013.01); *B01D 53/1468* (2013.01); *B01D 53/1475* (2013.01); *B01D 53/1493* (2013.01); *B01D 2252/204* (2013.01); *B01D 2252/608* (2013.01); *G05D 21/02* (2013.01)

(58) Field of Classification Search
CPC ............... B01D 19/0063; B01D 19/04; B01D 19/0404; B01D 2252/204; B01D 2252/608; B01D 2256/24; B01D 53/1412; B01D 53/1462; B01D 53/1468; B01D 53/1475; B01D 53/1493; G05D 21/02
See application file for complete search history.

(56) References Cited

U.S. PATENT DOCUMENTS

| 5,004,588 A | 4/1991 | Nisula et al. |
| 6,656,977 B2 | 12/2003 | Slone et al. |

(Continued)

FOREIGN PATENT DOCUMENTS

| JP | H09248402 | 9/1997 |
| JP | 2016000380 | 1/2016 |

(Continued)

OTHER PUBLICATIONS

Machine translation of JP-2016000380-A (Year: 2021).*

(Continued)

*Primary Examiner* — Robert A Hopkins
(74) *Attorney, Agent, or Firm* — Fish & Richardson P.C.

(57) ABSTRACT

A method of managing foam in a gas processing system includes flowing a gas processing solution through a processing line and flowing an antifoaming agent through a treatment line into a mixed fluid line to form a fluid mixture, determining a foam level of the fluid mixture at a foam controller disposed along the mixed fluid line, automatically controlling a valve disposed along the treatment line to control a flow rate at which the antifoaming agent is flowed into the mixed fluid line to achieve a target dose of the antifoaming agent to be mixed with the gas processing solution in the mixed fluid line based on the foam level determined at the foam controller, and flowing the fluid mixture containing the target dose of the antifoaming agent into a system component to prevent an amount of the foam in the gas processing system from exceeding a threshold amount.

17 Claims, 2 Drawing Sheets

(51) Int. Cl.
*B01D 19/04* (2006.01)
*B01D 53/14* (2006.01)
*G05D 21/02* (2006.01)

(56) References Cited

U.S. PATENT DOCUMENTS

2008/0142414 A1    6/2008   Gramme et al.
2017/0348616 A1   12/2017   Kisty
2018/0142175 A1    5/2018   Tan

FOREIGN PATENT DOCUMENTS

JP       2016000380 A   *   1/2016
WO     2005069965         8/2005

OTHER PUBLICATIONS

PCT International Search Report and Written Opinion in International Appln. No. PCT/US2020/031822, dated Jul. 15, 2020, 13 pages.

Al-Qahtani et al., "Reduce gas plant costs and shut downs with appropriate antifoam substitutes," retrieved on Jan. 15, 2016, retrieved from URL <http://www.gasprocessingnews.com/features/201512/reduce-gas-plant-costs-and-shutdowns-with-appropriate-antifoam-substitutes.aspx>, 5 pages.

Gondule et al., "Control of Foam Formation in the Amine Gas Treating System," International Advanced Research Journal in Science, Engineering and Technology (IARJSET), AGNI-PANKH 16, Jawaharlal Darda Institute of Engineering and Technology, Yavatmal, Jan. 2017, 4(3): 183-188.

Jameh et al., "Is your antifoam compatible with the amine system?" Hydrocarbon Processing, Jan. 2011, 8 pages.

GCC Examination Report received in Gulf Cooperation Council Appln. No. GC 2020-39700, dated Aug. 6, 2021, 4 pages.

* cited by examiner

MANAGING FOAM IN GAS PROCESSING SYSTEMS

TECHNICAL FIELD

This disclosure relates to managing foam levels in a gas processing system by automatically controlling dose delivery of an antifoaming agent during an acid gas removal process.

BACKGROUND

Acid gas removal in oil and gas applications is a process in which aqueous solutions of alkylamines (for example, amines) are used to remove hydrogen sulfide ($H_2S$) gas and carbon dioxide ($CO_2$) gas (for example, acid gases) from a hydrocarbon gas that is being processed in various settings, such as oil refineries, petrochemical plants, and natural gas processing plants. Removing $H_2S$ and $CO_2$ gases from a hydrocarbon gas may be desirable for several reasons. For example, $H_2S$ gas is poisonous and lethal, $H_2S$ and $CO_2$ gases may corrode a pipeline infrastructure, and $CO_2$ gas may stall operation of a gas processing plant due to freezing. The process of removing acid gas from another gas is known as gas sweetening. A gas containing above certain amounts of $H_2S$ and $CO_2$ gas may be referred to as a sour gas or an acid gas, whereas a gas that is substantially free of $H_2S$ and $CO_2$ gases may be referred to as a sweet gas. An amine solution that contains at least a threshold concentration of $H_2S$ and $CO_2$ gases (for example, after mixing with a sour gas) is often referred to as a rich amine solution, whereas an amine solution that contains less than the threshold concentration of $H_2S$ and $CO_2$ gases (for example, after undergoing regeneration) is often referred to as a lean amine solution.

During an acid gas removal process, both a lean amine solution and a sour gas are flowed into an absorber of a gas processing system, where the lean amine solution reacts with $H_2S$ and $CO_2$ gases in the sour gas, thereby removing the $H_2S$ and $CO_2$ gases from the sour gas and becoming a rich amine solution. Within and downstream of the absorber, foams (for example, gases trapped within pockets formed of thin liquid films) tend to form in the rich amine solution due to impurities in the amine solution. Such foams can be detrimental to both the gas processing system and to the acid gas removal process carried out thereon. Accordingly, an antifoaming agent may be delivered to the gas processing system in order to reduce foaming within the gas processing system.

SUMMARY

This disclosure relates to methods of managing foam levels in a gas processing system by automatically controlling dose delivery of an antifoaming agent during an acid gas removal process. Such methods can be carried out by controlling a metering valve that adjusts a flowrate of the antifoaming agent based on empirically-derived functions that account for non-linear foam behavior within the gas processing system.

In one aspect, a method of managing foam in a gas processing system includes flowing a gas processing solution through a processing line and flowing an antifoaming agent through a treatment line into a mixed fluid line to form a fluid mixture of the gas processing solution and the antifoaming agent, determining a foam level of the fluid mixture at a foam controller disposed along the mixed fluid line, automatically controlling a valve disposed along the treatment line to control a flow rate at which the antifoaming agent is flowed into the mixed fluid line to achieve a target dose of the antifoaming agent to be mixed with the gas processing solution in the mixed fluid line based on the foam level determined at the foam controller, and flowing the fluid mixture containing the target dose of the antifoaming agent into a component of the gas processing system to prevent an amount of the foam in the gas processing system from exceeding a threshold amount.

Embodiments may provide one or more of the following features.

In some embodiments, the gas processing solution in the treatment line includes an amine solution that removes acid gas from a hydrocarbon gas flowed through the gas processing system.

In some embodiments, the amine solution in the processing line is substantially free of acid gas.

In some embodiments, the method further includes automatically determining the foam level of the fluid mixture at the foam controller periodically.

In some embodiments, the method further includes capturing a non-linear behavior of the foam level of the fluid mixture in the mixed fluid line.

In some embodiments, the method further includes processing a signal generated by the foam controller and automatically controlling the valve based on the signal.

In some embodiments, automatically controlling the valve includes opening the valve.

In some embodiments, automatically controlling the valve includes closing the valve.

In some embodiments, the method further includes recirculating an amount of the antifoaming agent within the treatment line upstream of a pump disposed along the treatment line for pumping the antifoaming agent into the mixed fluid line.

In some embodiments, the method further includes determining a target dose injection rate of the antifoaming agent based on an empirically-derived function in order to achieve the target dose of the antifoaming agent.

In some embodiments, the target dose of the antifoaming agent falls within a range of about 15 ppm to about 40 ppm.

In some embodiments, the amount of foam in the gas processing system is a volume of foam in the gas processing system.

In some embodiments, the threshold amount of foam in the gas processing system is equal to about 20 mL.

In some embodiments, the amount of foam in the gas processing system is a height of foam in the gas processing system.

In some embodiments, the component includes an absorption unit.

In some embodiments, the method further includes flowing the gas processing solution from a regeneration unit to the gas processing line.

In some embodiments, the method further includes flowing a gas into the component of the gas processing system.

In some embodiments, the method further includes reacting the mixed fluid with the gas within the component of the gas processing system.

In some embodiments, the gas includes a hydrocarbon gas.

In some embodiments, the method further includes removing $H_2S$ and $CO_2$ from the hydrocarbon gas.

The details of one or more embodiments are set forth in the accompanying drawings and description. Other features, aspects, and advantages of the embodiments will become apparent from the description, drawings, and claims.

DETAILED DESCRIPTION

Figure 1:
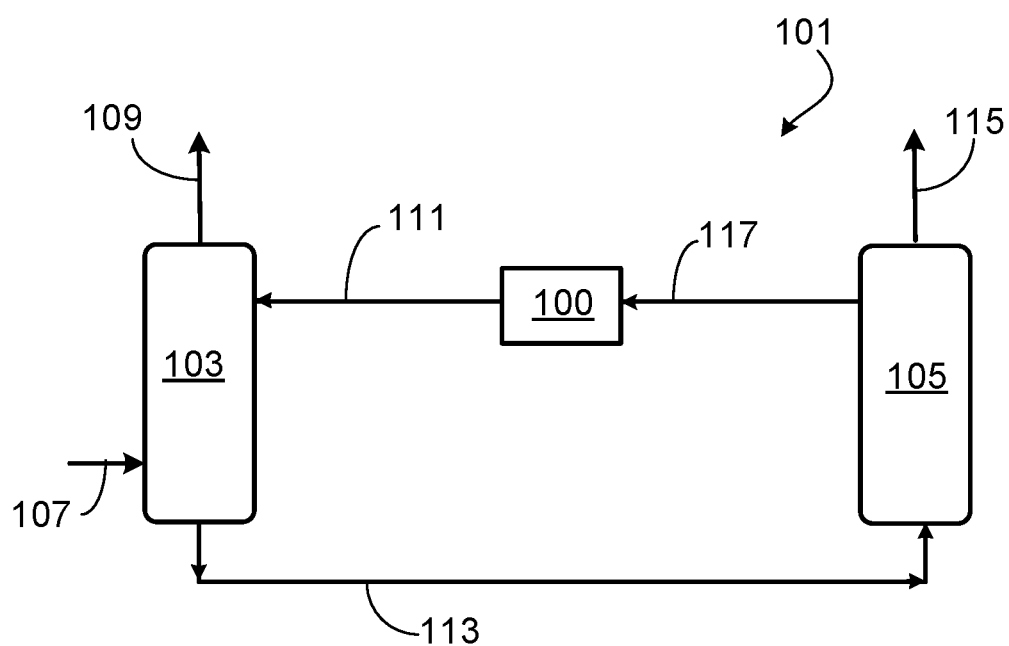
FIG. 1 is a schematic diagram of a gas processing system for removing acid gas from a hydrocarbon gas.

FIG. 1 is a schematic diagram of a gas processing system 101 in which a gas sweetening process can be carried out to remove hydrogen sulfide ($H_2S$) gas and carbon dioxide ($CO_2$) gas (for example, acid gases) from a hydrocarbon gas. The gas processing system 101 includes an absorption system 103, a regeneration system 105, and a gas treatment system 100. The gas treatment system 100 is designed to manage (for example, control, minimize, reduce, or maintain) foam levels (for example, heights or volumes of foam) in an amine solution that circulates in the gas processing system 101. The amine solution is an organic, basic solution that reacts with $H_2S$ and $CO_2$ gases mixed with the hydrocarbon gas to form acid gases that can be separated from the hydrocarbon gas. An amine solution containing such acid gases above a threshold concentration may be referred to as a rich amine solution, whereas an amine solution containing such acid gases below the threshold concentration (for example, such that the amine solution may be considered substantially free of acid gases) may be referred to as a lean amine solution. In some embodiments, the threshold concentration may be about 0.02 moles (mol) acid gas/mol amine to about 0.06 mol acid gas/mol amine (for example, about 0.045 mol acid gas/mol amine). Foam can form in the amine solution within the gas processing system 101 as a result of one or both of impurities in the amine solution and impurities in the hydrocarbon gas.

In addition to the components discussed above, the gas processing system 101 further includes a sour gas line 107 that delivers sour gas to the absorption system 103, a sweet gas line 109 by which sweet gas exits the absorption system 103, a lean amine line 111 that delivers a substantially foam-free lean amine solution from the gas treatment system 100 to the absorption system 103, and a rich amine line 113 that carries a rich amine solution from the absorption system 103 to the regeneration system 105. In some examples, the term "line" refers to a fluid-carrying conduit, such as a pipe, a channel, or another generally tubular member. Within the absorption system 103, the lean amine solution absorbs $H_2S$ and $CO_2$ from the sour gas, such that the sour gas is converted to sweet gas that flows out of the absorption system 103 through the sweet gas line 109.

The gas processing system 101 further includes an acid gas line 115 by which $H_2S$ gas and $CO_2$ gas exits the regeneration system 105 and a lean amine line 117 that delivers a foam-containing lean amine solution (for example, less than about 10 milliliters (mL) of such solution) from the regeneration system 105 to the gas treatment system 100. Within the regeneration system 105, $H_2S$ gas and $CO_2$ gas are removed from the rich amine solution, such that the $H_2S$ gas and $CO_2$ gas flows out of the regeneration system 105 through the acid gas line 115 and such that rich amine solution is converted to a lean amine solution that flows out of the regeneration system 105 through the lean amine line 117. The gas processing system 101 also includes several other functional components that have been omitted for clarity, such as components of the absorption system 103 (for example, an absorber), components of the regeneration system 105 (for example, a regenerator, a reboiler, and a condenser), and various other components (for example, valves, fluid lines, and pumps).

The gas treatment system 100 is designed to deliver a mixed flow of a lean amine solution and an antifoaming agent to the absorption system 103 for minimizing amounts of foam formed in the absorption system 103 and other components of the gas processing system 101. The antifoaming agent (for example, also known as a defoamer) is a chemical additive that can reduce the amounts of foam in the amine solution by lowering surface tension of thin liquid film bubbles of the foam such that gas trapped in the bubbles is released and the thin liquid films subsequently collapse into a bulk flow of the amine solution. Example antifoaming agents that may be used in the gas treatment system 100 include silicone or glycol bases.

Figure 2:
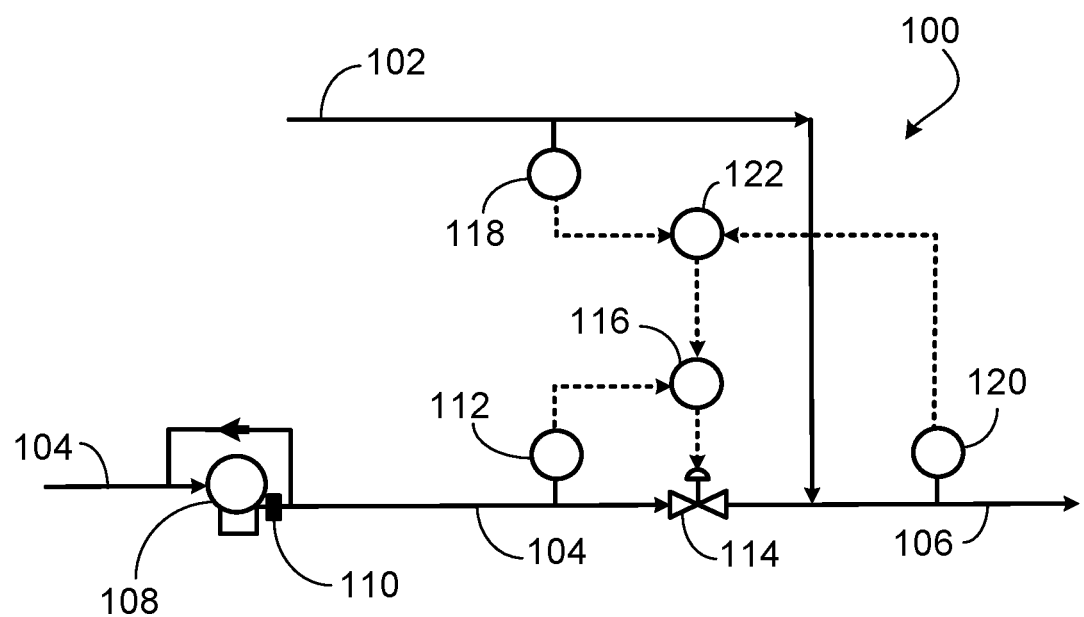
FIG. 2 is a schematic diagram of a gas treatment system of the gas processing system of FIG. 1 for managing foam in the gas processing system.

Referring to FIG. 2, the gas treatment system 100 includes a lean amine line 102 for delivering the lean amine solution and an antifoam line 104 for delivering the antifoaming agent to a mixed flow line 106. As discussed above with respect to FIG. 1, the lean amine solution contained within the lean amine line 102 has been substantially stripped of acid gas by the regeneration system 105. The mixed flow line 106 introduces a flow mixture of the lean amine solution and the antifoaming agent to the absorption system 103 for ongoing removal of $H_2S$ and $CO_2$ from sour gas within the absorption system 103.

The gas treatment system 100 further includes a pump 108 for delivering the antifoaming agent to the antifoam line 104, a recycle valve 110 for recirculating certain amounts of the antifoaming agent upstream of the pump 108, a flow sensor 112 for measuring a flow rate of the antifoaming agent, a metering valve 114 for adjusting the flow rate of the antifoaming agent, a flow controller 116 for controlling operation of the metering valve 114, a flow sensor 118 for measuring a flow rate of the lean amine solution, a foam controller 120 for analyzing the foam level in the flow mixture, and a multiplying relay 122 for sending a signal to the flow controller 116 based on signals outputted from the foam controller 120 and the flow sensor 118.

In operation of the gas treatment system 100, the foam controller 120 samples and analyzes the flow mixture to determine a foaming tendency of the flow mixture. The foaming tendency may be defined as a volume of foam in a bulk fluid flow. In other examples, the foaming tendency may be defined as a height of a foam level in a bulk fluid flow. In some embodiments, the foam controller 120 includes a sample bottle that collects a sample volume (for example, about 500 mL) of the flow mixture, a mechanism for injecting nitrogen gas into the sample bottle, a level radar that detects a height of the sample volume before and after injection of the nitrogen gas, and circuitry and processors for performing calculations and processing signals. In some examples, an absolute difference in the sample volume before and after nitrogen injection is equal to the foaming tendency of the flow mixture.

Based on the foaming tendency of the flow mixture determined at the foam controller 120, the foam controller 120 then determines a target volume flow rate I at which the antifoaming agent should be injected into the mixed flow line 106 to prevent the foaming tendency in the gas processing system 101 from exceeding an acceptable threshold foaming tendency according to the following empirically-derived equation:

$$I=[c*t*V]/f$$

where:

I is the target volume flow rate in liters (L)/minute (min) at which the antifoaming agent should be injected into the mixed flow line 106;

c is a concentration in percentage (%) of active ingredient within the antifoaming agent (for example, also known as an effective concentration) and is determined as a function of the foaming tendency measured at the foam controller 120 according to experimental values provided in Table 1;

t is a target mass flow rate in parts per million (ppm)/min at which the antifoaming agent is injected into the mixed flow line 106;

V is a total liquid volume capacity (L) of the gas processing system 101; and f is an empirically-derived, unitless conversion factor.

The value of t is an empirically-derived number that typically falls in a range of about 10 ppm/min to about 40 ppm/min. In some examples, the foaming tendency should be maintained below a threshold value of about 20 mL, which reflects a liquid that is considered to be substantially foamless in the gas processing system 101.

TABLE 1

Empirical data reflecting concentration c (%) as a function of foaming tendency (mL) at the foam controller 120.

| Foaming Tendency (mL) | Active Ingredient Concentration, c (%) |
|---|---|
| 220 | 7 |
| 180 | 13 |
| 140 | 16 |
| 100 | 18 |
| 80 | 23 |
| 40 | 28 |
| <20 | 37 |

The foam controller 120 sends a targeting signal reflecting the foaming tendency to the multiplying relay 122 such that the active ingredient concentration c can be obtained according to Table 1. Based on the targeting signal, and a based on a flow signal received from the flow sensor 118 reflecting a volume flow rate of the amine solution, the multiplying relay 122 sends a control signal to the flow controller 116 for adjustment of the metering valve 114. The pump 108 has a fixed capacity and pumps the antifoaming agent at a fixed stroke volume (for example, 100% stroke volume capacity). Therefore, a volume flow rate of the antifoaming agent is controlled via operation of the metering valve 114, and not via adjustment of the pump 108. Based on the control signal received at the follow controller 116, and based on a flow signal received from the flow sensor 112 reflecting a volume flow rate of the antifoaming agent, the flow controller 116 sends an operational signal to the metering valve 114, causing the metering valve 114 to open to some degree, to close to some degree, or to be maintained at a previous state to achieve or maintain the target volume flow rate I at which the antifoaming agent is injected into the mixed flow line 106. Based on operation of the metering valve 114, the recycle valve 110 may be adjusted to recirculate an amount of the antifoaming agent upstream of the pump 108 at a certain volume flow rate to prevent a back pressure from building up at an outlet of the pump 108.

In some embodiments, a control loop that initiates with the analysis at the foam controller 120 occurs within the gas treatment system 100 periodically, such as once per hour. In this manner, the foam controller 120 captures a non-linear behavior of the foaming tendency along the mixed flow line 106, such that the antifoaming agent can accordingly be delivered to the mixed flow line 106 as necessary to maintain the foaming tendency within the sample bottle of the foam controller 116 below a threshold value of about 20 mL. Such foaming tendency within the sample bottle of the foam controller 120 also corresponds to an acceptable threshold foaming tendency of about 20 mL within other portions of the gas processing system 101. In some embodiments, operation of the gas treatment system 100 as discussed above can reduce the foaming tendency detected at the foam controller 120 by about 50% or more within a period of only about 5 seconds (s) at a low dose of antifoaming agent of about 0.0025 ppm.

Accordingly, utilization of the gas treatment system 100 can ensure that the mixed flow of lean amine solution and antifoaming agent provided to the absorption system 103 through the mixed flow line 106 has an acceptable foaming tendency. Such mixed flow can allow the hydrocarbon gas within the absorption system 103 to be maintained at desired specifications during processing and can minimize amine losses in the gas processing system 101 due to foaming. Therefore, usage of the gas treatment system 100 can prevent costly and time-consuming upsets to operation (for example, shutdowns) of the gas processing system 101 and minimize time-consuming chemical preparation of amine solution that would otherwise be unnecessarily consumed or lost to continuous injection in conventional gas processing systems. For example, operation of the gas treatment system 100 can ensure that only an amount of the antifoaming agent that is necessary for managing the foaming tendency (for example, maintaining the foaming tendency at or below the threshold value) is consumed. This is in contrast to operation of conventional gas processing systems, for which an antifoaming agent is often injected on a continual basis without determination of a minimum necessary amount of the antifoaming agent and without adequate determination of how an amine solution in a gas processing system is responding to injection of the antifoaming agent. Operation of the gas treatment system 100 also has a low implementation cost, allows for fast corrective action as related to foaming behavior (for example, according to automated operation of the foam controller 120), and has a green footprint due to minimization of off-specification gas that would otherwise be wasted in a conventional gas processing system.

Figure 3:
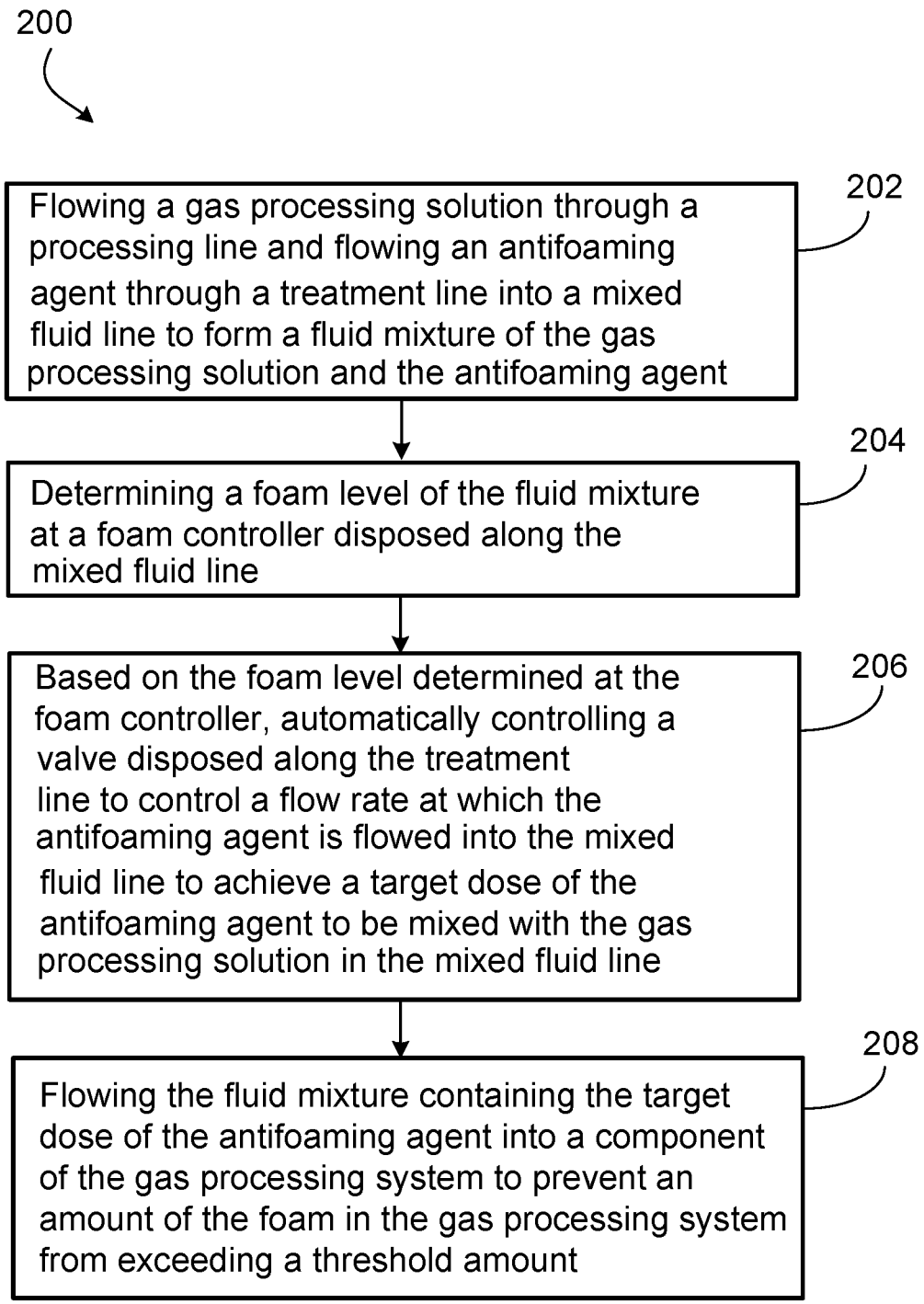
FIG. 3 is a flow chart illustrating an example method of managing foam in the gas processing system of FIG. 1.

FIG. 3 is a flow chart illustrating an example method 200 of managing foam in a gas processing system (for example, the gas processing system 101). In some embodiments, the method 200 includes flowing a gas processing solution (for example, a lean amine solution) through a processing line (for example, the lean amine line 102) and flowing an antifoaming agent through a treatment line (for example, the antifoam line 104) into a mixed fluid line (for example, the mixed flow line 106) to form a fluid mixture of the gas processing solution and the antifoaming agent (202). In some embodiments, the method 200 further includes determining a foam level of the fluid mixture at a foam controller (for example, the foam controller 120) disposed along the mixed fluid line (204). In some embodiments, the method 200 further includes automatically controlling a valve (for example, the metering valve 114) disposed along the treatment line to control a flow rate at which the antifoaming agent is flowed into the mixed fluid line to achieve a target dose of the antifoaming agent to be mixed with the gas processing solution in the mixed fluid line based on the foam level determined at the foam controller (206). In some embodiments, the method 200 further includes flowing the fluid mixture containing the target dose of the antifoaming agent into a component (for example, the absorption system 103) of the gas processing system to prevent an amount of the foam in the gas processing system from exceeding a threshold amount (208).

While the gas treatment system 100 has been described and illustrated with respect to certain dimensions, sizes, shapes, arrangements, materials, methods 200, and oil and gas applications, in some embodiments, a gas treatment system that is otherwise substantially similar in construction and function to the gas treatment system 100 may include one or more different dimensions, sizes, shapes, arrangements, and materials or may be utilized according to different methods or utilized for other applications, such as paper processing or food processing applications.

Other embodiments are also within the scope of the following claims.

What is claimed is:

1. A method of managing foam in a gas processing system, the method comprising:
   flowing a gas processing solution through a processing line and flowing an antifoaming agent through a treatment line into a mixed fluid line to form a fluid mixture of the gas processing solution and the antifoaming agent;
   recirculating an amount of the antifoaming agent within the treatment line upstream of a pump disposed along the treatment line for pumping the antifoaming agent into the mixed fluid line to prevent a backpressure from building up at an outlet of the pump;
   determining a foam level of the fluid mixture at a foam controller disposed along the mixed fluid line;
   based on the foam level determined at the foam controller, automatically controlling a valve disposed along the treatment line to control a flow rate at which the antifoaming agent is flowed into the mixed fluid line to achieve a target dose of the antifoaming agent to be mixed with the gas processing solution in the mixed fluid line; and
   flowing the fluid mixture containing the target dose of the antifoaming agent into a component of the gas processing system to prevent an amount of the foam in the gas processing system from exceeding a threshold amount,
   wherein the foam level of the fluid mixture is determined automatically at the foam controller periodically to detect a non-linear behavior of the foam level of the fluid mixture in the mixed fluid line and thereby ensure that no more than an amount of the antifoaming agent than is necessary to prevent the amount of the foam from exceeding the threshold amount is consumed.

2. The method of claim 1, wherein the gas processing solution in the processing line comprises an amine solution that removes acid gas from a hydrocarbon gas flowed through the gas processing system.

3. The method of claim 2, wherein the amine solution in the processing line is substantially free of acid gas.

4. The method of claim 1, further comprising processing a signal generated by the foam controller and automatically controlling the valve based on the signal.

5. The method of claim 1, wherein automatically controlling the valve comprises opening the valve.

6. The method of claim 1, wherein automatically controlling the valve comprises closing the valve.

7. The method of claim 1, further comprising determining a target dose injection rate of the antifoaming agent.

8. The method of claim 1, wherein the target dose of the antifoaming agent falls within a range of about 15 ppm to about 40 ppm.

9. The method of claim 1, wherein the amount of foam in the gas processing system comprises a volume of foam in the gas processing system.

10. The method of claim 9, wherein the threshold amount of foam in the gas processing system is equal to about 20 mL.

11. The method of claim 1, wherein the amount of foam in the gas processing system comprises a height of foam in the gas processing system.

12. The method of claim 1, wherein the component comprises an absorption unit.

13. The method of claim 12, further comprising flowing the gas processing solution from a regeneration unit to the gas processing system.

14. The method of claim 1, further comprising flowing a gas into the component of the gas processing system.

15. The method of claim 14, further comprising reacting the mixed fluid with the gas within the component of the gas processing system.

16. The method of claim 14, wherein the gas comprises a hydrocarbon gas.

17. The method of claim 16, further comprising removing $H_2S$ and $CO_2$ from the hydrocarbon gas.

* * * * *